Patented Oct. 31, 1950

2,528,359

UNITED STATES PATENT OFFICE 2,528,359

POLYEPOXIDE-CONTAINING COMPOSITIONS AND REACTION PRODUCTS

Sylvan Owen Greenlee, Louisville, Ky., assignor to Devoe & Raynolds Company, Inc., Louisville, Ky., a corporation of New York No Drawing. Application April 10, 1946, Serial No. 661,059

15 Claims. (Cl. 260—45.2)

This invention relates to new products and compositions resulting from the reaction of polyepoxides with condensates of aldehydes and ammonia derivatives (amines and amides) in regulated proportions to give valuable compositions which are useful in the manufacture of varnishes, molding compositions, adhesives, films, fibers, molded articles, etc. The invention includes initial reaction mixtures or compositions containing the polyepoxides and aldehyde amine or aldehyde amide condensates or mixtures thereof as well as intermediate and final reaction products or compositions and methods for their production and articles and products made therefrom.

The invention includes as primary and important embodiments thereof reaction mixtures and reaction products of polyepoxides with urea aldehyde condensates and with melamine aldehyde condensates and mixtures thereof.

According to the present invention condensates of aldehydes with ammonia derivatives (amines and amides) in the form of initial or intermediate reaction products are admixed with polyepoxides or are reacted with such polyepoxides to form new compositions suitable for reaction or further reaction to form new complex reaction products.

One of the objects of the invention is the production of initial reaction mixtures or compositions containing condensates of aldehydes and ammonia derivatives and particularly urea aldehyde condensates or melamine aldehyde condensates or mixtures thereof with simple polyepoxides in proportions suitable for reaction by direct addition to form resins, films, molding compositions, etc.

Another object of the invention is the production of intermediate reaction products of such condensates and polyepoxides which are capable of further reaction to form insoluble, infusible products and the preparation of higher molecular weight and more complex compositions from such intermediate reaction products.

Another object of the invention is the production of films, articles, molded products and other final reaction products of outstanding properties from such condensates and simple polyepoxides.

Other objects of the invention will appear from the following more detailed description.

The aldehyde-ammonia derivative condensates which are used for reacting with the polyepoxides according to the present invention are condensates formed by the reaction of aldehydes and particularly formaldehyde with ammonia derivatives, including amines and amides, and more particularly with ureas and melamine to form, e. g., urea aldehyde condensates or melamine aldehyde condensates. It is known that various amines and amides will condense with aldehydes to form aldehyde-amine and aldehyde-amide condensates. Thus urea, thiourea and various substituted ureas and urea derivatives will react with aldehydes such as formaldehyde to form condensates, e. g., methylol ureas, etc. Similarly, it is well known that melamine will react with aldehydes and particularly formaldehyde to form melamine-aldehyde condensates. Various other amines and amides can similarly be reacted with formaldehyde, etc. to form condensates which are amine aldehyde or amide aldehyde resins or condensates. Thus, other amino-triazines and amino diazines will similarly react with aldehydes to form condensates.

The polyepoxides used for reaction with the aldehyde amine and aldehyde amide condensates contain two or more epoxide groups. The simplest diepoxide will contain at least four carbon atoms as in the case of 1,2-epoxy-3,4-epoxy butane. The epoxy groups may be separated from each other by ether groups or linkages as in the case of bis-(2,3-epoxy propyl) ether, bis-(2,3-epoxy-2-methyl propyl) ether, etc. The polyepoxides may also be of a somewhat more complex character such as those that result from the reaction of two or more mols of a diepoxide with one mol of a dihydric phenol, or the reaction of three or more mols of a diepoxide with one mol of a trihydric phenol, etc. The polyepoxide compounds used may have varying structures and may be of complex structure so long as they do not contain groups which interfere with the desired reaction of the polyepoxide and the aldehyde amine or aldehyde amide condensate.

Diepoxides or polyepoxides derived from polyhydric alcohols such as mannitol, sorbitol, erythritol, pentaerythritol or polyallyl alcohol may also be used. Valuable polyepoxides for use in making the new compositions may thus be obtained by the reaction of epichlorhydrin on polyhydric alcohols containing three or more hydroxyl groups. Thus a trihydric alcohol such as glycerol or trimethylol propane can be reacted with epichlorhydrin in the proportions of one mol of trihydric alcohol to three mols of epichlorhydrin using a catalyst which will promote reaction of the epoxide group of the epichlorhydrin with a hydroxyl group of the alcohol, and with subsequent treatment of the reaction products to produce polyepoxides. Such polyepoxides may contain, for example, approximately two epoxide groups per molecule, even though three mols of epichlorhydrin are reacted with one mol of a trihydric alcohol, complex or side reactions apparently taking place which result in the production of products containing free hydroxyl groups or chlorine or cyclic ring compounds or polymeric compounds which may be present in the resulting product. However, such polyepoxides may advantageously be used, together with aldehyde amide and aldehyde amine condensates such as urea aldehyde condensates and melamine aldehyde condensates or mixtures thereof in producing the new compositions of the present invention.

The products of such reactions of epichlorhydrin on polyhydric alcohols containing three or more hydroxyl groups are usually difficult to fractionate to give the individual constituents in a pure form. However, such complex products, even though they are not pure compounds, may advantageously be used in making the new compositions of the present invention.

Some of the simpler diepoxides may be produced and obtained in a high degree of purity by fractional distillation to separate them from by-products formed during their manufacture. For example, such compounds as diepoxy butane and diglycid ether, may be separated by fractional distillation to give products of better than 95% purity as determined by the method of epoxide analysis as hereinafter described.

The procedure used in preparing the low molecular weight polyepoxides varies depending upon the starting material, that is, whether the starting material is a polyhydric phenol, a polyhydric alcohol, etc. and it also depends on whether the epoxide-contributing reactant is a dechlorhydrin, an epichlorhydrin, or a polyepoxide of a different type than the one being prepared. On the other hand, when the simple polyepoxides are prepared from polyhydric alcohols, it is often advantageous to first react the epoxide group of epichlorhydrin with the alcohol group present in the polyhydric alcohol in the presence of a catalyst such as boron trifluoride to produce an intermediate polychlorhydrin; this polychlorhydrin being then treated with some reagent which is capable of removing hydrochloride to form epoxide groups.

The polyepoxide used may contain small and varying amounts of mixed monoepoxides. To the extent that monoepoxides are present they will react with the aldehyde amine or aldehyde amide condensates to form hydroxy alkyl groups or chains which in most cases contain primary alcohol groups. These alcohol groups when formed may react with epoxide groups and may thus take part in the formation of more complex reaction products. In certain cases the presence of monoepoxy hydroxy compounds may be desirable and advantageous especially during the final hardening operation and at higher temperatures in the presence of a catalyst, under which conditions the hydroxyl groups may readily react with the epoxide groups.

The functional groups contained in the polyepoxides are primarily epoxide groups but the polyepoxides may also contain hydroxyl groups. They are free from functional groups other than epoxy and hydroxyl groups, such as basic or acid groups.

The aldehyde condensates with ammonia derivatives (amines and amides) used with the polyepoxides in making the new compositions of the present invention are in general partial and intermediate reaction or condensation products of aldehydes, particularly formaldehyde, with amines and amides or mixtures thereof.

In general, fusible urea aldehyde condensates of different degrees of condensation may be used with the epoxides to form the new compositions and reaction products. Thus, urea aldehyde condensates may be made by various processes known in the art for the manufacture of urea formaldehyde resins. The urea aldehyde condensates may thus be a water soluble type, an alcohol soluble type or an oil soluble type.

The urea aldehyde condensate may be one derived from the normal urea (carbamide) or it may be one derived from thiourea (thiocarbamide). Likewise, the condensate may be one derived from a substituted urea or a non-substituted urea. Some of the substituted ureas or thioureas such as those substituted with a long chain alkyl group give products which are more highly soluble in oil and hydrocarbon type compositions than are the usual non-substituted products and such products are useful in making the new compositions of the present invention.

A urea aldehyde condensate which is essentially an alkylol or polyalkylol urea and is not a polymer may be used in the preparation of the new compositions and reaction products, or the urea aldehyde condensate may be used as a highly condensed product so long as it is still fusible and is soluble in or blendable with the epoxide composition with which it is to be reacted.

Similarly the melamine aldehyde condensate may be one derived from melamine and an aldehyde or it may be derived from a melamine of somewhat modified structure. For example, the melamine used in preparing the melamine aldehyde condensate may have part of its hydrogen replaced by long alkyl chains and such condensates are useful in making the new compositions of the present invention.

In general, melamine aldehyde condensates of different states of condensation, so long as they are fusible, may be used with the epoxides to form the new compositions and reaction products. For example, the melamine aldehyde product may be a non-polymeric alkylol or polyalkylol melamine or it may be a highly condensed product in which case a number of molecules of melamine have been combined with each other through condensation of the alkylol groups.

Aldehyde condensates derived from amines closely related to melamine in structure, that is, of the triazine and diazine types, may be used in reactions with the epoxides according to the present invention.

Many of the commercial products derived from the reaction of urea or melamine with formaldehyde are mixed products made by reacting the formaldehyde with mixtures of urea and melamine. Such composite or mixed reaction products can advantageously be used for reaction with the epoxides according to the present invention.

Many of the present day commercial resins prepared by the reaction of urea or melamine or both with aldehydes are prepared in the presence of alcoholic or other solvents which actually take part in the reaction and become an integral part of the resulting resin composition. This is illustrated by the products prepared in the presence of butyl alcohol in which case the butyl alcohol to some extent condenses with the alkylol groups of the aldehyde condensate to give butyl ether residues as a part of the final composition. Such modified products are advantageously used in reactions with the epoxide to give the new compositions of the present invention.

The condensates of aldehydes with ammonia derivatives (amines and amides) are in general resinous in character but in the early stages of the condensation may be water soluble. Various aldehydes may be used in making such condensates but formaldehyde is particularly advantageous, and is the aldehyde commonly used in making aldehyde amine and aldehyde amide condensates. Various ammonia derivatives (amines and amides) can be used for reaction with the aldehydes to form the condensates. It is known that various amines will condense with aldehyde to form amine aldehyde resins. Thus, melamine will readily condense with formaldehyde to form melamine aldehyde condensates or resins. Other amino diazines and amino triazines can be similarly used. Various amides can similarly be condensed with aldehydes to form aldehyde-amide condensates. Urea formaldehyde condensates are formed by the condensation of formaldehyde with urea, substituted ureas, thioureas and substituted thioureas.

It is generally known that urea aldehyde condensates and melamine aldehyde condensates are formed by the direct addition of the aldehyde to the amine or amide group to form intermediate alkylol groups or compounds. Such products may then be further condensed to form polymers by the application of heat and in some cases without the application of heat in the presence of certain catalysts. Even in condensed products of an advanced stage of condensation there may be alkylol groups present which have not entered into the condensation reaction. There is also present in these compositions an appreciable percentage of hydrogen atoms directly attached to nitrogen atoms present in the amine or amide group. Epoxide groups of the epoxides can react under proper conditions with such compounds containing hydrogen atoms which are directly attached to oxygen or nitrogen.

It is also generally known that both urea aldehyde condensates and melamine aldehyde condensates condense to form infusible products which are lacking in flexibility to such an extent that they may be unsuitable for the formation of protective coatings, impregnation of porous materials, or for molding objects unless they are highly plasticized to make them suitable for such usage.

According to the present invention such urea aldehyde condensates and melamine aldehyde condensates which would normally give brittle conversion products and would require a high percentage of plasticizer to give products of suitable flexibility for various uses can be reacted with epoxides to give products which are usually tough, hard and flexible provided the proper reaction proportions and conditions are used; in fact, these aldehyde condensates when reacted with epoxides in the proper proportions give reaction products which have suitable flexibility for protective coating films without the use of any plasticizer.

While the urea aldehyde condensates or the melamine aldehyde condensates may be at different stages of conversion when used for compounding with the polyepoxides, compositions of somewhat different characters can be obtained with products of different stages of conversion. Thus, in some cases it is desirable to have a composition which is completely soluble in water or alcohol or in a mixture of these solvents; and in that case it is advantageous to use a urea aldehyde condensate or a melamine aldehyde condensate which is essentially a non-condensed alkylol derivative together with a simple polyepoxide which is water soluble or alcohol soluble. Many of the simple polyepoxides are readily soluble in alcohol and many of them are soluble in water. By using such polyepoxides with soluble condensates in a common solvent solutions can be prepared and applied and the solvent subsequently evaporated before the main reaction between the polyepoxide and the condensate takes place. Compositions can thus be made which are aqueous solutions of the condensate and polyepoxide which can be used to impregnate porous materials, etc. and the reactants subsequently caused to react after removal of the solvent and heating to a higher temperature.

For other purposes it is desirable to use a powdered solid resin together with a liquid reactant and in such cases the aldehyde condensate may be a finely divided solid material and the polyepoxide used in a liquid form. For other applications very viscous compositions are desired and in this case one or more ingredients of the reaction mixture would be partially polymerized so as to obtain the desired viscosity.

In making the new compositions the aldehyde condensate and the polyepoxide are compounded in reacting proportions either without or with the addition of a catalyst and the reaction will in general be carried out with the application of heat.

The reactions which take place between the polyepoxide and the aldehyde condensates appear to be complex in nature. While I do not desire to limit myself by any theoretical explanation of the exact nature or mechanism of the reaction it seems probable that the reaction is in part one between an epoxide group of the polyepoxide with active hydrogen atoms directly attached to oxygen or to nitrogen in the aldehyde condensates. Since it is known that urea aldehyde condensates and melamine aldehyde condensates convert upon the application of heat to infusible products through the condensation of alkyl groups with each other or with active hydrogen directly attached to nitrogen it seems likely that the final conversion of the compositions containing the polyepoxides and aldehyde condensates includes a number of reactions among them the normal condensation reactions of the urea aldehyde condensates or of the melamine aldehyde condensates and the reaction of epoxide groups of the polyepoxides by direct addition to hydroxyl groups or to amine or amide groups of the condensates; while reaction may also take place between epoxide groups with hydroxyl groups present in the polyepoxides or liberated in the course of the reaction of epoxide groups with other active hydrogen atoms; and direct polymerization may take place of the epoxides with themselves. Whatever the theoretical explanation may be of the reactions which take place when the polyepoxides are compounded with the aldehyde condensates and caused to react therewith, valuable reaction products can be produced as a result of such reactions.

It may well be that various reactions take place simultaneously or successively in the process of reaction of the polyepoxides and aldehyde condensates to form the intermediate and final reaction products.

When a mixture of urea aldehyde condensates and melamine aldehyde condensates are used with the polyepoxides, and the reaction mixtures are heated to bring about reaction, it may be that certain reactions take place at a more rapid rate than others. But in any event the final reaction products, when made of proper proportions of the aldehyde condensates and polyepoxides, form valuable reaction products.

Just as the different aldehyde condensates may be more or less reactive with the polyepoxides so the different polyepoxides may vary in their reactivity with the aldehyde condensates. Thus the simpler polyepoxides appear to have a greater reactivity than the more complex polyepoxides. For example, diepoxy butane appears to be more active than is diglycid ether in conversion reactions with the aldehyde condensates. Likewise those polyepoxides with higher functionality appear to be more reactive than those of lower functionally. For example, a polyepoxide composition having an average of two and one-half epoxide groups per molecule appears to be more reactive than a polyepoxide having an average of two epoxides per molecule.

Catalysts which have been found particularly advantageous for bringing about the reaction of the epoxides with the aldehyde condensates are alkaline catalysts such as aliphatic amines, sodium and potassium hydroxide and alkali phenoxides. Certain of the Friedel-Crafts type catalysts are also catalytic for these reactions. Of such catalysts boron trifluoride has been found to be extremely active in promoting such reactions and in fact too active in a number of cases to be used as such. However, if a latent type catalyst which on the application of heat liberates boron trifluoride is used, the reaction may be controlled such that it gives a smooth conversion. The latent type of boron trifluoride catalysts referred to are usually coordinated compounds of boron trifluoride with amines, amides, sulfides and the like. Likewise certain diazonium salts may be prepared which contain boron trifluoride in a form which is not active at ordinary temperatures but decomposes at higher temperatures to give boron trifluoride which catalyzes the polymerization or reaction through epoxide groups.

The final conversion of the composition made with the polyepoxides and aldehyde condensates may be carried out with or without the use of solvents and with or without the use of plasticizers, depending on the final results desired.

In protective coating applications it is desirable in many cases to be able to apply a product or composition which is of a suitable viscosity for use or application without the use of any solvent. Such compositions can readily be prepared according to the present invention. It is thus possible to prepare a urea aldehyde condensate or a melamine aldehyde condensate which is essentially of the non-condensed form and admix this condensate with a suitable simple polyepoxide so as to obtain a liquid composition without the use of solvents which is suitable for certain protective coating applications. Such liquid compositions containing no solvent are likewise valuable in the impregnation of porous and fibrous materials.

Similarly, in making molded objects it is desirable to have a molding composition which may be poured into the mold and which contains no volatile solvent which will give trouble in the final curing process. Such molding compositions can readily be made without the use of a solvent by forming a homogeneous liquid composition of the aldehyde condensate and polyepoxide.

It is generally recognized that the addition of plasticizers to impart flexibility to otherwise brittle products is undesirable in that the plasticizer adds nothing to the film strength while the plasticizer is often lost, especially from protective coatings by a leaching out process which takes place on ageing and which results in a final, brittle product. The improved compositions of the present invention enable urea aldehyde condensates or melamine aldehyde condensates or mixed condensates which usually give very brittle films or molded objects on conversion to be formed into final products which are sufficiently flexible and tough for use as protective coating materials and molded objects without the use of plasticizers, by proper formulation of the mixtures of the polyepoxides and the aldehyde condensates and converting the resulting composition into the final product.

The present invention provides a wide range of reaction compositions and products including initial mixtures of aldehyde condensates with polyepoxides, as well as partial or intermediate reaction products of such initial mixtures, and compositions containing such intermediate reaction products, as well as final reaction products and compositions.

The compositions of the present invention may be used without or with fillers and extenders of the inert type. For example, valuable enamels may be obtained by pigmenting the initial or intermediate compositions with the usual type of inert pigments used in the formulation of enamels and paints. It is also sometimes desirable to use such inert materials as wood flour or asbestos with the new compositions in the preparation of certain molded objects. For example, brake linings and clutch linings may be formulated from mixtures of asbestos type materials with the new compositions.

For certain applications such as the manufacture of certain resin bonded grinding wheels it is desirable to introduce abrasive materials and other fillers into the compositions in which the resinous composition acts as a bonding material for the fillers and abrasives when the compositions are subjected to final hardening.

In addition to having outstanding physical properties such as toughness and flexibility the final conversion products produced from the new compositions have outstanding chemical properties. Such products are highly resistant to oxidation, water, alkali, acids, solvents, etc.

Films and objects made from the new compositions are also relatively free from yellowing on ageing, apparently due to the fact that there are present none of the chemical groups which are sensitive to the action of air and moisture in the presence of light which in the case of so many of the protective coating materials known in the art form color groups.

It has also been observed that films prepared from the new compositions have unusually high adhesion for surfaces, particularly when non-basic or small amounts of basic catalysts are used. This is especially desirable in such application as protective coating films and even with certain molded objects such as the mold used to cement the bristles of an ordinary paint brush into the metal ferrule. This unusual adhesion to surfaces is apparently due to the fact that the compositions contain a high percentage of polar groups, such as unreacted alcohol hydroxyl groups, ether groups, amide and amine groups. Even though the new compositions of the present invention do contain a high percentage of these polar groups in the final converted products, the tolerance for water is unusually low, apparently due to the high molecular weight and rigid structure of the final material.

The invention will be further illustrated by the following specific examples but it will be understood that the invention is not limited thereto. In the examples the parts are by weight.

Examples V to XII, inclusive, illustrate new compositions and products of the invention, while Examples I to IV describe the production of initial aldehyde condensates and polyepoxides used in other examples.

Examples I and II describe the production of urea formaldehyde and thiourea formaldehyde condensates or resins, but it will be understood that such condensates or resins are well-known and commercially available in various forms.

Example I

A water soluble urea formaldehyde condensate was prepared as follows: a mixture of 240 parts of urea, 520 parts of formalin (40% formaldehyde), 20 parts of concentrated ammonium hydroxide, and .8 part of sodium carbonate was refluxed for 2 hours, to give a syrupy product which contained 53½% solids by weight.

Example II

A mixture of 520 parts (6 mols) of formalin, .8 part of sodium carbonate, 20 parts of concentrated ammonium hydroxide, and 304 parts (6 mols) of thiourea was refluxed for ½ hour to give a syrupy product containing 60% solids.

Examples III and IV illustrate the production of polyepoxides which are advantageously used in making the new compositions and products.

Example III

In a reaction vessel provided with a mechanical stirrer and external cooling means was placed 276 parts (3 mols) of glycerol and 828 parts (9 mols) of epichlorhydrin. To this reaction mixture was added 1 part of 45% boron trifluoride ether solution diluted with 9 parts of ether. The reaction mixture was agitated continuously. The temperature rose to 50° C. over a period of 1 hour and 44 minutes, at which time external cooling with ice water was applied. The temperature was held between 49° C. and 77° C. for 1 hour and 21 minutes.

To 370 parts of this product in a reaction vessel provided with a mechanical agitator and a reflux condenser was added 900 parts of dioxane and 300 parts of powdered sodium aluminate. With continuous agitation this reaction mixture was gradually heated to 93° C. over a period of 1 hour and 51 minutes and held at this temperature for 8 hours and 49 minutes. After cooling to room temperature the inorganic material was removed by filtration. The dioxane and low boiling products were removed by heating the filtrate to 250° C. at 20 mm. pressure to give 261 parts of a pale yellow product.

This product can be distilled at temperatures above 200° C. at 2 mm. pressure provided it is sufficiently freed from impurities, but unless care is taken it is liable to undergo a violent exothermic reaction. It is not, however, necessary to purify this product by distillation since such by products as are present do not interfere with the use of the product as a polyepoxide.

The epoxide equivalent of this product was determined by titrating a one gram sample with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering 1 HCl is equivalent to one epoxide group.

The epoxide equivalent represents the equivalent weight of the product per epoxide group. The epoxide equivalent so determined was 149. The molecular weight as determined by a standard boiling point elevation method was 324. This represents an average of 2.175 epoxide groups per molecule, assuming the determined molecular weight is the molecular weight. It is probable that the molecular weight is an average molecular weight of a product containing more than one reaction product. The average molecular weight is higher than that which would correspond to a product made up solely of the reaction product of 1 mol of glycerol with 3 mols of epichlorhydrin and it seems probable that complex reaction products are also formed, some of which may be of a polymeric or cross-linked nature. The product is, however, a valuable product for use as a polyepoxide in making the new compositions.

Example IV

By a procedure similar to that described in Example III, 1 mol of trimethylol propane and 3 mols of epichlorhydrin were condensed with boron trifluoride and finally treated with sodium aluminate to give 299 parts of a pale yellow liquid.

The product had an equivalent weight to epoxide of 151 and an average molecular weight of 292.2. This corresponds to approximately 1.94 epoxide groups per molecule, assuming an average molecular weight.

The product of this example can also be distilled at high temperatures and low pressures to give a water white liquid, but such further purification is not necessary and the product obtained can be directly used in making the new compositions. Or the purified product can be produced and similarly used.

The procedure of Examples III and IV can be used in preparing complex polyepoxy products from other polyhydric alcohols containing 3 or more hydroxyl groups, for example, from higher molecular weight alcohols containing 3 hydroxyl groups or from higher polyhydric alcohols such as mannitol, sorbitol, erythritol or polyallyl alcohol. For example, a polyepoxide has been obtained from polyallyl alcohol and epichlorhydrin which contained 2.45 epoxide groups per average molecular weight. In general, with polyepoxides made by the reaction of epichlorhydrin on polyhydric alcohols containing 3 or more hydroxyl groups, the number of epoxide groups per molecule (based on average molecular weight) has been found to be materially less than that corresponding to 1 epoxide group per molecule of epichlorhydrin used; but in general polyepoxides can be so produced containing an equivalent of around 2 or more epoxide groups per molecule which are valuable polyepoxides for use in making the new compositions and reaction products of the present invention.

Examples V to XII illustrate the production of new compositions and products from the aldehyde condensates and polyepoxides of the foregoing examples and from other aldehyde condensates and polyepoxides.

Example V

A mixture of 100 parts of the product of Example I and 100 parts of diglycid ether was treated with 10 parts of diethylene triamine to give a product of suitable viscosity for use as a varnish.

Films of .003 inch thickness made from this aqueous product when heated for ½ hour at 150° C. gave a hard infusible product.

Likewise, equal parts of the product of Example I and the product of Example III, treated with diethylene triamine, gave a product which on heat treatment gave a hard infusible film.

Example VI

A mixture of 10 parts of the product of Example II and 54 parts of the product of Example III was heated until all of the water was removed and the resulting solution was treated with 1½ parts of sodium phenoxide to give a product which when spread in thin films and baked for 3 hours at 150° C. gave a flexible film.

Example VII

A mixture of 100 parts of the product of Example III and 100 parts of a urea formaldehyde butanol resin of 50% solids and 10 parts of dietheylene triamine gave a product which when heated in the form of thin films or in layers of thicknesses up to ½ inch at 200° C. gave infusible products.

Similar results were obtained when the product of Example III was replaced by the product of Example IV.

Example VIII

A mixture of 100 parts of the product of Example III and 100 parts of a urea formaldehyde butanol resin of 50% solids was treated with 4 parts of oxalic acid to give a product which when heated for ½ hour at 200° C. in thin films of .003 inch thickness gave hard flexible products.

Example IX

A mixture of 100 parts of the product of Example III and 100 parts of a urea formaldehyde butanol resin of 50% solids was treated with 4 parts of oxalic acid to give a product which when spread in films of any thickness up to ¼ inch and heated for ½ hour at 200° C. gave hard infusible products.

Example X

A mixture of 100 parts of the product of Example III and 100 parts of a melamine formaldehyde butanol resin of 50% solids and 10 parts of diethylene triamine, when heated in the form of thin films of .003 inch thickness for ½ hour at 150° C. gave hard flexible products.

Example XI

A mixture of 50 parts of the product of Example IV and 100 parts of an alkyd modified melamine formaldehyde resin of 50% solids and 1½ parts of potassium hydroxide gave a product which when baked for ½ hour at 150° C. in layers of ¼ to ½ inch thickness gave infusible products.

Example XII

A mixture of 100 parts of the product of Example IV and 100 parts of a urea modified melamine formaldehyde butanol resin of 50% solids, and 2 parts of sodium hydroxide was heated in thick layers of ¼ to ½ inch thickness for ½ hour at 150° C. to give infusible products.

In a similar manner, other compositions and reaction mixtures and products can be produced from other simple polyepoxides and other aldehyde amine and aldehyde amide condensates and resins.

It will thus be seen that the present invention provides resins and plastic compositions and products in which aldehyde condensates are admixed with polyepoxides to form initial compositions capable of conversion into intermediate or into final reaction or polymerization products.

It will also be seen that the initial compositions of polyepoxides and aldehyde amine or aldehyde amide condensates, etc., may be used directly in making liquid coating compositions or in making molded articles, etc., and subsequent conversion by heating into the final reaction product.

It will further be seen that intermediate reaction products can be produced which are soluble and fusible and which are capable of further reaction to form final infusible products.

The new compositions are capable of admixture with various other resins in forming the final molding mixtures and can also be used for compounding with fillers in making molded articles or in impregnating paper, fabric, wood, etc., and making impregnated or coated or laminated articles.

It will also be seen that the reaction between the polyepoxide and the aldehyde amine or aldehyde amide condensate is mainly one of direct reaction by addition of epoxide to hydroxyl or amine or amide groups with resulting formation of ether linkages with the polyepoxides capable of acting as cross linking reactants with the aldehyde condensates.

The final infusible reaction and polymerization products made with the new compositions form a remarkable combination of desirable properties.

The term "organic ammonia derivative" as used in the appended claims is defined as organic amines or organic amides containing active hydrogen attached to a nitrogen atom.

I claim:

1. The method of producing a complex reaction product useful in the plastic arts which comprises admixing a fusible alkylated condensate of an aldehyde with an organic ammonia derivative selected from the group which consists of ureas and melamine and containing reactive hydrogen with a substantial proportion of a liquid aliphatic polyepoxide free from reactive functional groups other than epoxy and hydroxyl groups, and heating the same to form a complex reaction product.

2. The method of producing a complex reaction product useful in the plastic arts which comprises admixing a fusible alkylated condensate of an aldehyde with an organic ammonia derivative selected from the group which consists of ureas and melamine and containing reactive hydrogen with a substantial proportion of a liquid aliphatic polyepoxide free from reactive functional groups other than epoxy and hydroxyl groups, and heating the same to form a complex reaction product in the presence of a catalyst selected from the group which consists of aliphatic amines, alkali metal hydroxides, alkali phenoxides and boron trifluoride catalysts.

3. The method of producing a complex reaction product useful in the plastic arts which comprises admixing a fusible alkylated condensate of an aldehyde with an organic ammonia derivative selected from the group which consists of ureas and melamine and containing reactive hydrogen with a substantial proportion of a liquid aliphatic polyepoxide free from reactive functional groups other than epoxy and hydroxyl groups, and causing the same to react to form a complex reaction product with heating to a temperature in excess of about 150° C.

4. The method of forming a complex reaction product useful in the plastic arts which comprises admixing and heating a fusible butylated urea formaldehyde resin containing reactive hydrogen with a substantial proportion of a liquid aliphatic polyepoxide free from reactive functional groups other than epoxy and hydroxyl groups.

5. The method of forming a complex reaction product useful in the plastic arts which comprises admixing and heating a fusible butylated melamine formaldehyde resin containing reactive hydrogen with a substantial proportion of a liquid aliphatic polyepoxide free from reactive functional groups other than epoxy and hydroxyl groups.

6. A reaction mixture for forming complex reaction products useful in the plastic field, containing in substantial proportions a liquid aliphatic polyepoxide free from reactive functional groups other than epoxide and hydroxyl groups and a fusible alkylated condensate of an aldehyde with an organic ammonia derivative selected from the group which consists of ureas and melamine and containing active hydrogen.

7. A composition as defined in claim 6 which also contains a catalyst selected from the group which consists of aliphatic amines, alkali metal hydroxides, alkali phenoxides and boron trifluoride catalysts.

8. A reaction mixture for forming complex reaction products useful in the plastic field containing in substantial proportions a liquid aliphatic polyepoxide free from reactive functional groups other than epoxide and hydroxyl groups and a fusible butylated urea formaldehyde resin containing active hydrogen.

9. A reaction mixture for forming complex reaction products useful in the plastic field containing in substantial proportions a liquid aliphatic polyepoxide free from reactive functional groups other than epoxide and hydroxyl groups and a fusible butylated melamine formaldehyde resin containing active hydrogen.

10. A reaction mixture for forming complex reaction products useful in the plastic field containing a liquid aliphatic polyepoxide free from reactive functional groups other than epoxide and hydroxyl groups and a fusible butylated urea formaldehyde resin containing active hydrogen in the proportions of from about 1 part of resin to 1 of polyepoxide by weight to about 1 of resin to 2 parts of polyepoxide.

11. A reaction mixture for forming complex reaction products useful in the plastic field containing a liquid aliphatic polyepoxide free from reactive functional groups other than epoxide and hydroxyl groups and a fusible butylated melamine formaldehyde resin containing active hydrogen in the proportions of from about 1 part of resin to 1 of polyepoxide by weight to about 1 of resin to 2 parts of polyepoxide.

12. A composition as defined in claim 8 which also contains a catalyst selected from the group which consists of aliphatic amines, alkali metal hydroxides, alkali phenoxides and boron trifluoride catalysts.

13. A composition as defined in claim 9 which also contains a catalyst selected from the group which consists of aliphatic amines, alkali metal hydroxides, alkali phenoxides and boron trifluoride catalysts.

14. A composition as defined in claim 10 which also contains a catalyst selected from the group which consists of aliphatic amines, alkali metal hydroxides, alkali phenoxides and boron trifluoride catalysts.

15. A composition as defined in claim 11 which also contains a catalyst selected from the group which consists of aliphatic amines, alkali metal hydroxides, alkali phenoxides and boron trifluoride catalysts.

SYLVAN OWEN GREENLEE.

REFERENCES CITED

The following references are of record in the file of this patent:

UNITED STATES PATENTS

| Number | Name | Date |
| --- | --- | --- |
| 2,076,624 | DeGroote | Apr. 13, 1937 |
| 2,131,120 | Schlack | Sept. 27, 1938 |
| 2,136,928 | Schlack | Nov. 15, 1938 |
| 2,228,514 | Greissbach et al. | Jan. 14, 1941 |

FOREIGN PATENTS

| Number | Country | Date |
| --- | --- | --- |
| 352,042 | Great Britain | July 3, 1931 |